United States Patent
Sieber et al.

[15] 3,688,172
[45] Aug. 29, 1972

[54] COMMUTATING DEVICE FOR BRUSHLESS MOTOR INCLUDING MAGNETIC DIODES

[72] Inventors: Paul Sieber, Lortzingstrasse 20, 71 Heilbronn-Bockingen; Joachim Kuhlmann, Breslauer Strasse 57, 71 Neilbroon-Neckargartach, both of Germany

[22] Filed: March 4, 1971

[21] Appl. No.: 120,918

[30] Foreign Application Priority Data

March 5, 1970 Germany..........P 20 10 385.9

[52] U.S. Cl. .................... 318/254, 324/46, 318/439, 318/138
[51] Int. Cl. ............................................. H02h 29/00
[58] Field of Search......318/254, 138, 696, 683, 439; 324/46

[56] References Cited

UNITED STATES PATENTS

| | | |
|---|---|---|
| 3,305,717 | 2/1967 | Weiss .........................318/254 |
| 3,476,997 | 11/1969 | Otzipka et al..........318/254 X |
| 3,504,252 | 3/1970 | Mouzala et al. ........318/254 X |
| 3,535,626 | 10/1970 | Uemura et al. ........318/254 X |
| 3,264,539 | 8/1966 | Sander....................318/254 X |

*Primary Examiner*—G. R. Simmons
*Attorney*—Spencer & Kaye

[57] ABSTRACT

A commutating device for a brushless direct current motor comprises a plurality of pairs of series connected magnetic diodes separated in the motor stator and acting as voltage dividers for the motor operating voltage, the voltage division being variable by a variation of the resistances of the diodes of a pair oppositely under the influence of a magnetic field, and a plurality of controllable switching units, each having an input electrode connected to the common junction of the series connection of one pair of diodes so as to control the switching units to connect the associated field winding to the operating voltage in synchronism with the rotation of the motor.

6 Claims, 1 Drawing Figure

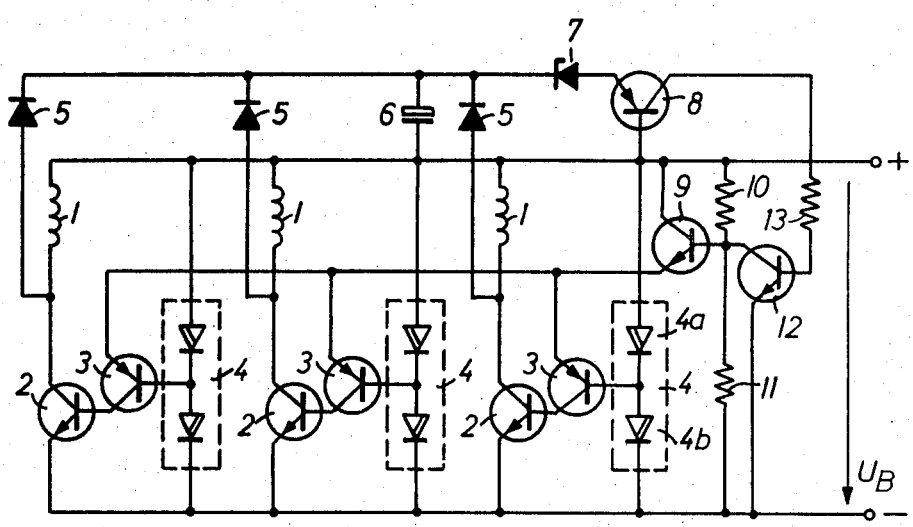

3,688,172

COMMUTATING DEVICE FOR BRUSHLESS MOTOR INCLUDING MAGNETIC DIODES

BACKGROUND OF THE INVENTION

The invention relates to a commutating device for a brushless direct current motor.

SUMMARY OF THE INVENTION

According to the invention, there is provided a commutating device for a brushless direct current motor comprising a plurality of pairs of series connected magnetic diodes with a center tap between the diodes of each said pair for disposition in a motor stator for voltage division of the motor operating voltage in a variable manner by varying the resistances of the diodes of a pair oppositely under the influence of a magnetic field, a plurality of controllable switching units, an input electrode for each said controllable switching unit and means for connecting said center tap of each of said pairs of series connected magnetic diodes to said input electrode of one of said controllable switching units for controlling said controllable switching units to connect an associated field winding to the operating voltage in synchronism with the rotation of the motor.

BRIEF DESCRIPTION OF THE DRAWINGS

The invention will now be described in greater detail, by way of example, with reference to the accompanying drawings, the single FIGURE of which is a circuit diagram of one form of commutating device in accordance with the invention.

DESCRIPTION OF THE PREFERRED EMBODIMENTS

Basically the invention resides in that, for a commutating device for a brushless direct current machine, pairs of magnetic diodes, connected in series, are mounted in the stator of the motor so that, under the influence of a magnetic field, the resistance of the one diode decreases while that of the other diode increases, that each pair of diodes serves as a voltage divider for the operating voltage, the center tap of which is connected to the input electrode of a controllable switching unit, by means of which the field winding associated with the pair of diodes is connected to the operating voltage in synchronism with the rotation of the motor, and that means are provided which influence the switching behavior of the switching unit and whereby the speed of the motor can be controlled or maintained constant. It has been found that the magnetic field of a permanent magnet is sufficient, in a direct-current motor, to control the field windings through transistors by means of two magnetic diodes connected in series in each case.

A magnetic-field or magnetic diode varies its ohmic resistance if it is operated in the forward direction, depending on the magnetic flux permeating the diode. This characteristic is utilized in the present commutating device. In order to compensate for dependence of this change in resistance on temperature, two like magnetic diodes are connected in series, both diodes being poled in the forward direction. Since the change in resistance depending on field is caused by a recombination region disposed at the lateral edge of the semiconductor body of a magnetic diode, these regions must be remote from one another when magnetic diodes are connected in series. If a fixed direct voltage is applied to the two diodes connected in series, half the input voltage normally drops at each diode, depending on the outside temperature prevailing. If a magnetic field acts on the two diodes, the ohmic resistance of the one diode increases while that of the other diode decreases. The variation in potential resulting at one of the two diodes with a varying field strength is supplied to the following circuit elements as a signal.

Referring now to the circuit shown in the drawing, the three field windings of the stator are designated by the reference numeral 1. These field windings 1 are offset in relation to one another by 120° in the stator. In order to control the current in each field winding, a pair of magnetic diodes 4 is provided in each case, and consists of the magnetic diodes 4a and 4b connected in series.

This pair of diodes 4 forms a voltage divider and is preferably connected between the poles of the source of operating voltage ($U_B$). The diodes must be arranged in such a manner that they are operated in the forward direction. In the state without any field, therefore, half the operating voltage will drop at each magnetic diode, regardless of the temperature.

The center tap of the voltage divider consisting of the pair of diodes 4 leads to the base electrode of a switching transistor 3, the collector electrode of which is in turn connected to the base electrode of a following complementary transistor 2. The field winding associated with the pair of diodes 4 is connected into the collector lead of this complementary transistor 2. The series connection consisting of the collector-emitter space of the complementary transistor 2 described which has a common emitter connection, and the field winding 1, is preferably connected between the poles of the source of operating voltage.

The complementary transistors 2 are controlled by the switching transistors 3 so that one transistor 2 is always carrying current when the associated transistor 3 is likewise conducting. The control of the switching transistors 3 is effected through the magnetic diodes so that each field coil conducts current across the conducting transistor 2 at the correct moment. With a bipolar permanent-magnet armature, the pairs of magnetic diodes are therefore accommodated in the stator offset by 120° in relation to one another.

The emitter electrodes of the switching transistors 3 are connected to a common bias voltage which is so selected that the switching transistors 3 are cut off in the absence of a magnetic field.

If, on the other hand, a magnetic field is acting on one pair of magnetic diodes, a voltage swing is caused by the variation in resistance in the magnetic diodes and ensures that a current flows in the field winding associated with the magnetic diodes.

Starting from the polarity of the source of operating voltage $U_B$ indicated in the Figure, the switching transistors 3 may be of the p-n-p type of conductivity for example and all the emitter electrodes of these transistors be connected to a common bias voltage. If the bias voltage for the switching transistors 3 at the emitter electrodes corresponds to half the operating voltage, the switching transistors are cut off when no magnetic field is acting on the associated magnetic diodes. As a result of the influence of an appropriately poled magnetic field, the potential at the base electrode of one switching transistor 3 drops to such an extent that the transistor 3, and hence also the following complementary transistor 2, becomes conducting.

Since the field coil 1 is connected into the collector space of this complementary transistor 2 which is operated with a common emitter connection, this coil conducts current at the correct moment. On a rotation of the motor through 120°, the next field coil conducts current so that a rotating field is produced which causes the continuous running of the motor.

It is desirable to regulate the speed of the motor or to maintain it constant. This can be effected by varying the bias voltage at the emitter electrodes of the switching transistors 3. The emitter bias voltage is preferably varied so that it becomes more negative in comparison with the base voltage when the motor is to become slower, whereas it must become more positive with a motor to be accelerated.

In order to be able to vary the emitter potential of the transistor 3, a voltage divider consisting of the resistors 10 and 11 with a variable division ratio, is preferably connected between the poles of the source of operating voltage.

In order to maintain the speed constant, a variable-gain amplifier is preferably used in an advantageous further development of the device according to the invention. In this case, the tap of the voltage divider consisting of the resistors 10 and 11 is connected to the base electrode of a regulating transistor 9 which has an n-p-n sequence of regions with the polarity of the voltage source as given. The emitter electrode of this regulating transistor 9 is connected to the emitter electrodes of the switching transistors 3, while the collector is connected to the positive pole of the source of operating voltage. Furthermore, means must be provided which, by electronic comparison of the rectified counter emf with a threshold voltage provided, cause an automatic variation in the division ratio of the voltage divider consisting of the resistors 10 and 11 in such a manner that the emitter potential of the switching transistor 3 counteracts a variation in the motor speed.

The emf of the motor, which is proportional to the speed, is obtained by rectification through the diodes 5 which are connected between the field coil to the connection to the switching transistor 3 and the cathode of a common zener diode 7. The forward direction of the zener diode is opposite to that of the diodes 5 which in turn are so connected that a rectification of the positive half wave of the field current is effected. A smoothing capacitor 6 is connected between the common junction point of all the field coils 1 and the cathode of the zener diode 7. The cathode of the zener diode 7 is in turn connected to the emitter electrode of a transistor 8 which is operated with a common base connection and the polarity of which corresponds to that of the switching transistors 3.

If the emf of the motor is lower than the sum of the zener voltage and the base-to-emitter voltage of the transistor 8, then the transistor 8, and hence also the following transistor 12, is cut off. The emitter bias voltage of the switching transistors 3 is determined by the division ratio of the voltage divider consisting of the resistors 10 and 11.

If, as a result of an excessive speed, the rectified emf becomes greater than the zener diode 7 and the base-to-emitter voltage of the transistor 8, the transistor 8 carries a collector current and becomes conducting. The base electrode of the transistor 8 is connected to the positive pole of the source of operating voltage. Since the collector of the transistor 8 is connected, through a resistor 13, to the complementary transistor 12, which is operated with a common-emitter connection, this transistor 12 also becomes conducting when transistor 8 is conducting. The collector-to-emitter space of this transistor 12 is connected in parallel with one of the resistors 11 of the voltage divider so that when transistor 12 is conducting, this resistor 11 is at least partially bridged. The base potential of the regulating transistor 9 is lowered by this means which also leads to a lowering of the emitter potential at the switching transistors 3. The voltage swing at the magnetic diode 4a must therefore become greater in order that the transistor 3 may be switched through and the field coil conduct current. By this means, the speed is reduced to such an extent that the emf of the motor drops, the transistor 8 is again cut off and the speed can rise again.

In the example of a circuit illustrated in the Figure, the transistors 2, 9 and 12 are of the n-p-n type of conductivity and complementary to the transistors 3 and 8.

It will be understood that the above description of the present invention is susceptible to various modifications, changes and adaptations.

What is claimed is:

1. A commutation arrangement for a brushless direct current motor having a rotor and a stator with a plurality of field windings comprising: a plurality of pairs of series connected magnetic diodes, each of said pairs of diodes being associated with one of the field windings of the stator and each pair of diodes being arranged in the stator of the motor so that the resistance of one diode of each pair is decreased while the resistance of the other diode is simultaneously increased under the influence of the magnetic field from the rotor, each of said pairs of magnetic diodes being connected across the operating voltage terminals of the motor to serve as a voltage divider; a plurality of controllable switching means, each of which has its input electrode connected to the center tap of a respective one of said voltage dividers, for connecting the associated field winding across said operating voltage terminals in synchronism with the rotation of the rotor, each of said controllable switching means including a switching transistor, whose base electrode constitutes said input electrode and is connected to the center tap of the associated magnetic diode voltage divider, and a complementary transistor whose base electrode is connected to the collector electrode of said switching transistor, said complementary transistor having its collector-emitter-path connected in series with the one of said field windings which is associated with the associated magnetic diode voltage divider and across said operating voltage terminals, the emitter electrode of said switching transistor being connected to a common emitter bias line; bias control amplifier means, including a further voltage divider means connected across said operating voltage terminals for determining the control voltage of said control amplifier means, for supplying a bias potential to said common emitter bias line for cutting off each of said switching transistors in the absence of an appropriately poled magnetic field being applied to the associated magnetic diode voltage divider; and, automatic means for automatically maintaining the motor speed constant including electronic comparison means for comparing the counter emf generated in said field windings with a predetermined threshold voltage, and comparison responsive means for causing an automatic variation of the division ratio of said voltage divider means to control the emitter potential of said switching transistors to counteract variation in the motor speed.

2. A device as defined in claim 1, wherein said bias control amplifier means supplies a bias voltage which is substantially half said motor operating voltage.

3. A device as defined in claim 1 wherein said bias control amplifier means includes a regulating transistor having its emitter electrode connected to said common emitter bias line, its base electrode connected to the tap of said voltage divider means, and its collector electrode connected to one of said pairs of operating voltage terminals.

4. A device as defined in claim 3, wherein said automatic means comprises: a separate counter emf rectifying diode for rectifying the counter emf of each field winding; a zener diode for determining said predetermined threshold voltage and to which each of said counter emf rectifying diodes is connected; a common base connected transistor to which each of said counter emf rectifying diodes is connected through said zener diode; a collector electrode for said common base connected transistor; and means for connecting said collector electrode of said common base connected transistor to said base electrode of said regulating transistor.

5. A device as defined in claim 4 wherein said means for connecting said collector electrode of said common base connected transistor includes a further transistor having its base electrode connected to the collector electrode of said common base connected transistor and its collector-to-emitter path connected in parallel with a resistor of said voltage divider means.

6. A device as defined in claim 5 wherein said regulating transistor and said further transistor are each complementary to said switching transistor and said common base connected transistor.

* * * * *